March 8, 1949. L. SPRARAGEN 2,463,723
AIR FILTER
Filed Nov. 28, 1944 2 Sheets-Sheet 1
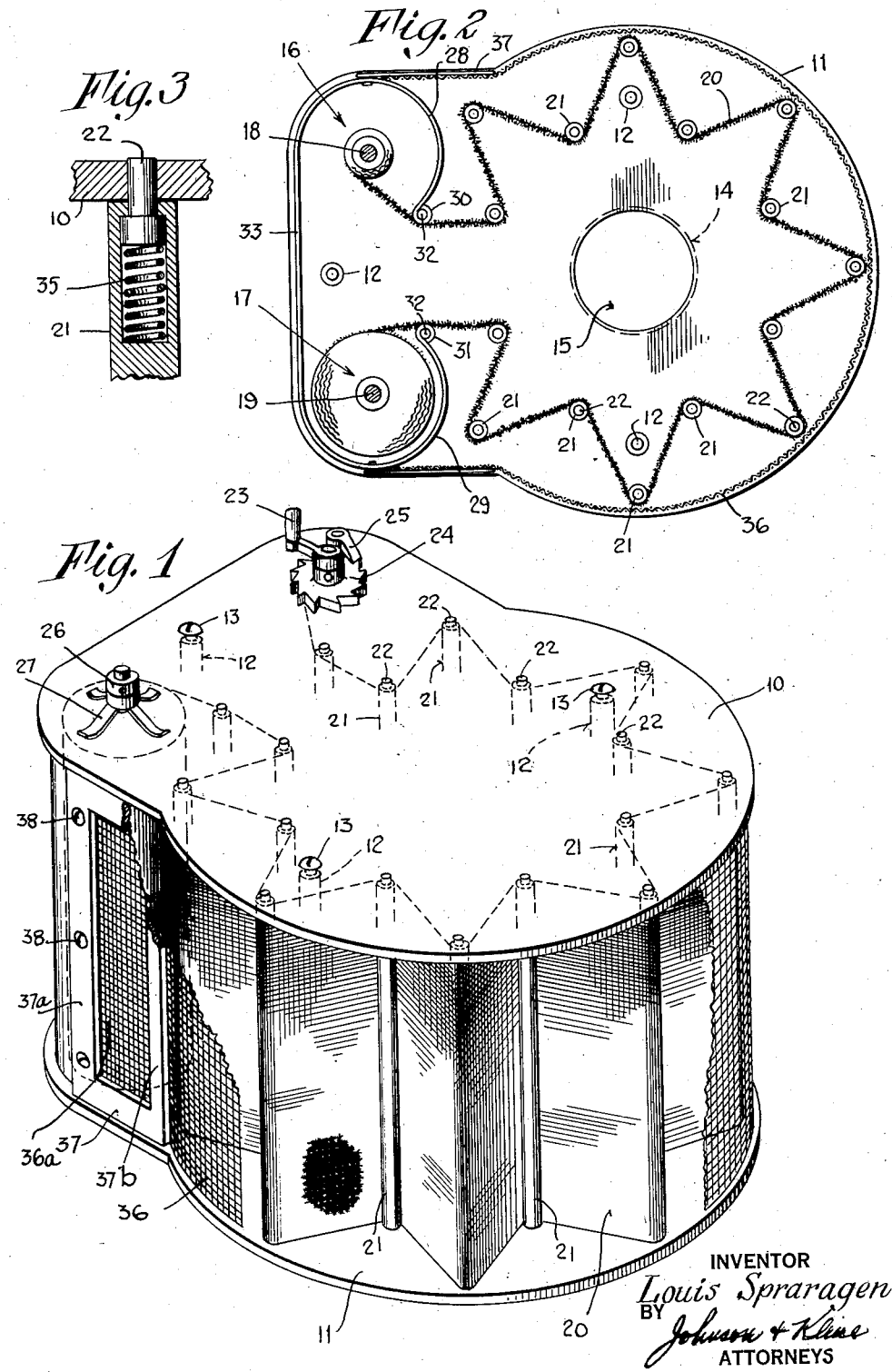
INVENTOR
Louis Spraragen
BY
Johnson + Kline
ATTORNEYS March 8, 1949.   L. SPRARAGEN   2,463,723
AIR FILTER
Filed Nov. 28, 1944   2 Sheets-Sheet 2
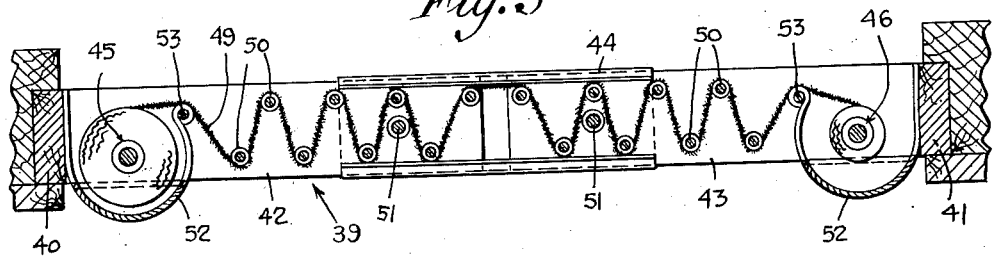
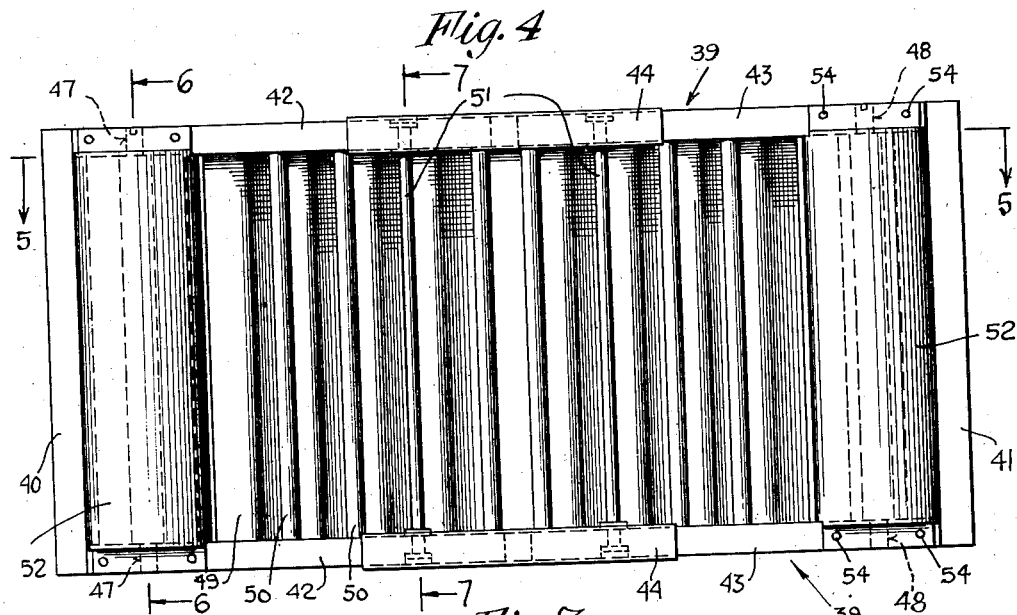
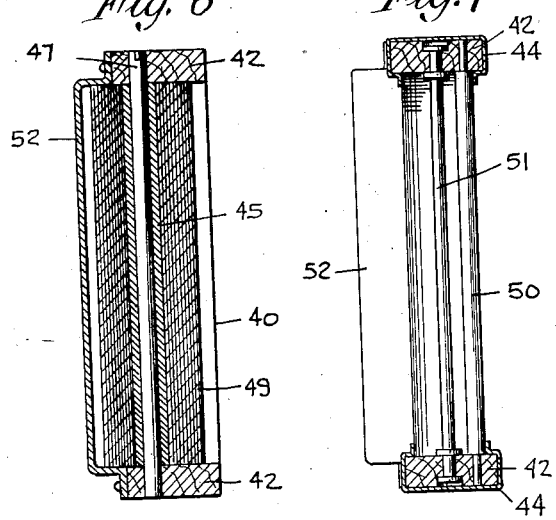
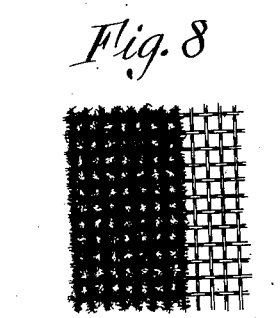
INVENTOR
*Louis Spraragen*
BY
ATTORNEYS Patented Mar. 8, 1949

2,463,723

UNITED STATES PATENT OFFICE 2,463,723

AIR FILTER

Louis Spraragen, Bridgeport, Conn.

Application November 28, 1944, Serial No. 565,476

4 Claims. (Cl. 183—62)

This invention relates to air filters, and more particularly to filters of this type wherein the filtering media may be cleaned or renewed when clogged with dirt or otherwise rendered useless or inefficient.

Heretofore various air-filtering devices have been proposed and used, these generally employing pads or sheets of cellular material through which the air passes and which arrest and trap dust and other foreign particles. In some of these devices the filtering medium upon becoming soiled or clogged may be removed by dismantling the devices, whereupon it may be cleaned and reinstalled for further use. In other devices the filtering medium is not adapted to be used over again but must be discarded and a new medium installed.

In each case it is generally necessary to dismantle the filtering device, which involves a certain amount of time, and then to either clean the filtering media or at some trouble and expense purchase and install a new element suitable for the particular style of device in use.

An object of this invention is to obviate the above disadvantages by providing a filter in which the filtering medium may be renewed with such ease, expedience, and economy that the user will not be inimical to performing the operation frequently, thereby obtaining uniformly more satisfactory results from the device over an extended period of time.

Another object of the invention is to provide a filter as above, which is extremely simple in construction and economical to manufacture, yet is of high efficiency and has prolonged usefulness.

These objects are accomplished in the embodiments of the invention illustrated herein by the provision of a filter unit having a substantially rigid frame or housing and having a cooperating filtering medium in the form of a comparatively stiff self-supporting dirt-arresting mesh which may be very simply mounted in the housing, portions of the mesh being exposed for use while other portions are stored in such a manner as to be conveniently available at a later time to replace the portions in use when the latter become clogged. The stored portions of the mesh are carried by a roller mounted in the housing, and a second roller is provided for storing the clogged portions, and for advancing the mesh in the housing to expose fresh portions of the latter from the storage roller. Preferably the mesh is formed of wire which is coated with flock to provide dirt-arresting tendrils, the structural characteristics of the mesh being such that it may be readily rolled upon rollers for storage, or fed around supporting or guide rollers when succeeding fresh portions are to be exposed for use, yet the mesh is sufficiently rigid and self-supporting so that an extremely simple structural arrangement may be provided for exposing large areas for filtering of the air.

This arrangement includes the use of supporting and guide rollers which are mounted in staggered relation with each other, the mesh or filtering strip extending in-and-out between the guide rollers to follow a zigzag path, and the edges of the strip, in following this path, abutting the inside surfaces of the frame. The rigidity of the strip is sufficient to cause the abutting edges to maintain close contact with the frame surfaces and thereby prevent escape of any substantial quantities of air past these points without use of additional guide rails, tracks, or other sealing means, yet the strip is flexible to the extent that it may be fed past the rollers when a renewal of the filtering area is required.

A novel housing is also provided to prevent inadvertent escape of air past the storage rollers regardless of whether these carry few or many layers of the mesh. This housing has mesh-engaging edges which remain in contact with the outer or intake surface of the mesh adjacent the storage rollers at all times, the housing encompassing the rollers and being connected to the frame to enclose the escape passage for air normally existant at the rollers.

By the present invention, therefore, a user need only turn the feeding roller of the filtering unit to renew the filter medium thereof, and the unit need not be disassembled, nor the clogged medium cleaned or replaced by a suitably fitting purchased element.

A sufficient amount of filtering strip may be stored in the unit so that a number of renewals of the filter medium may be had before a new strip need be installed, and therefore the filtering action of the unit over an extended period of time may be much more satisfactory than in units made prior to this invention.

Other features and advantages will hereinafter appear.

In the accompanying drawings:

Figure 1 is a perspective view, partly broken away, illustrating an air filter made according to one form of the invention, adaptable for use with internal combustion engines and the like.

Fig. 2 is a top or plan view of the filter of Fig. 1, but with the top plate of the frame removed.

Fig. 3 is a fragmentary sectional detail illustrating the end construction of one of the guide rollers of the filter.

Fig. 4 is a side elevation of an air filter made according to another form of the invention, adaptable for use as a window screen.

Fig. 5 is a horizontal section taken on the line 5—5 of Fig. 4.

Fig. 6 is a vertical section taken on the line 6—6 of Fig. 4.

Fig. 7 is a vertical section taken on the line 7—7 of Fig. 4 and

Fig. 8 is a fragmentary detail illustrating the construction of the filtering medium or screen.

The embodiment of the invention illustrated in Figs. 1 through 3, comprises a pair of substantially rigid parallel plates 10 and 11 securely held together in spaced relation by a plurality of tie-rods 12, the ends of which are threaded to receive screws 13.

The frame comprising the plates 10 and 11 is adapted to be attached to and supported by the air intake pipe of an internal combustion engine or other device by the provision of a circular depending flange 14, Fig. 2, secured to the underside of the plate 11, the latter having an aperture 15 located inside the flange 14.

According to the present invention a novel combination of filtering medium comprising a comparatively stiff sheet-like screen, and supporting and storage means for different portions of said screen is provided in connection with the plates 10 and 11 whereby a portion of the screen may be exposed between the plates for use, and may be at any time conveniently replaced by other, stored portions of the screen so that the filtering medium for the unit may thereby in effect be renewed. In accomplishing this, a pair of rollers 16 and 17 is provided, mounted in spaced relation with each other and extending between the plates 10 and 11, the rollers being rigidly carried on spindles 18 and 19 respectively, which extend through the plates. A sheet-like filtering medium 20, which is elongate and in the form of a flat strip, has its ends respectively secured to the rollers 16 and 17, the latter roller, which functions as a storage roller, carrying a substantial quantity of the filtering medium tightly rolled about it.

Between the rollers 16 and 17 the filtering medium 20 is extended along a tortuous path between the plates 10 and 11, so that a large area is exposed for filtering use.

For the purpose of guiding and partially supporting the filtering strip 20, a plurality of guide rollers 21 are provided, extending between the plates 10 and 11 and mounted in staggered relation with each other, the filtering strip passing in-and-out between the rollers so that it follows substantially a zigzag circular path, which in the present instance is essentially star-shaped.

The filtering medium 20 may be formed of wire mesh on which a coating of flock has been secured, as shown in Fig. 8. This mesh may be either of metallic or plastic wire, or wire of other suitable material. The mesh may also be formed of perforated sheet material such as metal, paper, fiber or the like, subsequently coated with flock. The fibers of the flock extend into the interstices of the mesh, as shown in Fig. 8, and entrap dust, dirt, and other foreign particles in the air being sucked through the mesh.

Filtering media constructed in the above manner are comparatively rigid and self-supporting, and when mounted between the spaced comparatively rigid plates 10 and 11 in the manner above described, cooperate along their edges which abut the inside surfaces of the plates, to provide a comparatively tight connection so that any substantial quantities of air are prevented from passing at these points without being filtered.

However, the stiffness of the mesh is not so great as to prevent it from being rolled around the rollers 16 and 17, or fed past the guide rollers 21 along the zigzag or star-shaped path indicated.

According to the present invention, when the exposed portions of the filtering strip 20 become clogged with dirt or otherwise useless, the roller 16 is turned so as to wind up on it the clogged portions of the screen and expose for use fresh portions which are supplied by the unwinding movement of the storage roller 17, thereby in effect renewing the filter. To facilitate this renewal operation, the spindle 18 of the roller 16 at its upper exterior end is provided with a crank handle 23, and adjacent the latter a ratchet 24 cooperating with a pawl 25 mounted on the exterior of the plate 10. The ratchet 24 and pawl 25 are arranged to permit turning of the roller 16 in the direction to wind up on it the filtering strip 20, and to prevent opposite rotation of the roller whereby the strip might be unwound. Thus, the roller 16 may be conveniently operated by turning the handle 23, the ratchet and pawl automatically preventing the screen from being unwound when the handle is let go of. Also, by the provision of the ratchet and pawl, a user is prevented from turning the roller 16 inadvertently in the wrong direction, whereby the screen would be unwound.

For the purpose of controlling the unwinding movement of the roller 17 the upper exterior end of the spindle 19 has rigidly mounted thereon a collar 26 cooperating with a friction spring 27 engaging the exterior of the plate 10 whereby the roller is yieldably held against inadvertent turning.

To prevent the escape of air past the rollers 16 and 17 from the exterior or intake side of the filtering strip 20 a pair of imperforate sheet metal housings 28 and 29 is provided extending between the plates 10 and 11 for partially encompassing the respective rollers. The housings 28 and 29 have curled edges 30 and 31 respectively through which pins 32 extend, the latter being received in suitable apertures in the plates 10 and 11. The edges 30 and 31 of the housings are so located that they continuously engage the outer surfaces of the filtering strip 20 regardless of whether the rollers 16 and 17 have a small or large quantity of strip rolled around them. The housings 28 and 29 are further connected together by an integral wall 33 extending between the plates 10 and 11 and enclosing the space between the rollers 16 and 17.

According to this construction, air which is sucked out through the aperture 15 in the lower plate 11 must enter the space between the plates through the interstices of the filtering strip 20 and be filtered thereby, since escape of air past the rollers is prevented by the housings 28 and 29, and since the comparative stiffness of the filtering strip 20 prevents unfiltered air from escaping past the edges of the latter which abut the inside surfaces of the plates 10 and 11.

In order to facilitate the initial assembly of the filtering unit, and to aid in the reinstallation of a completely new filtering strip 20 when this becomes necessary, the guide rollers 21 are provided at their ends with retractable spindle pins 22, Fig. 3, which are continually yieldably held outward by compression springs 35. Thus the guide rollers 21 may be inserted between the plates 10 and 11 after the latter have been rigidly secured together by the tie-rods 12 and screws 13. Also in removing a completely used filtering strip 20 and installing a new strip, the guide rollers 21 may be conveniently removed from between the plates 10 and 11 without dismantling the latter.

According to this form of the invention, a guard screen 36 is provided for enclosing the exposed portions of the filtering strip 20, the opposite ends of the guard screen being fastened to the housings 28 and 29. This fastening may be accomplished in any suitable manner. However, at present it is preferred to provide a pair of clamping frames 37 which are rectangular in shape and which may be blanked out of sheet metal, one side 37a of each of the frames being apertured to receive a plurality of screws 38 which are threaded into extruded apertures in the housings 28 and 29 as shown in Figs. 1 and 2. When the frames 37 are initially tightened to the housings, the edges 36a of the screen 36 are clamped and held against loosening. As the tightening of the screws 38 is carried further, the sides 37b of the frames will be urged inwardly thereby causing the screen to conform to the indented shape of the plates as shown.

Preferably the screen 36 is also comparatively rigid and self-supporting, and is coated with flock so that it functions to filter air before same reaches the filtering strip 20. In connection with this, it will be noted that a totally enclosed space is provided between the guard screen 36 and the filtering strip 20, so that air may not escape into the filtering unit from the outside without being doubly filtered.

Although the housings 28 and 29 are apertured and threaded for the screws 38, the latter fill the apertures completely so that air may not escape therethrough, and therefore for all practical purposes the housings may be considered as imperforate.

There is thus provided by the invention an extremely simple and economically produceable air-filtering unit for air sucking equipment such as internal combustion engines, air compressors and the like, wherein the filtering medium when clogged with dirt beyond further usefulness may be quickly renewed a number of times with a minimum of effort and trouble on the part of an operator.

Another form of the invention is illustrated in Figs. 5 through 7, wherein the filtering unit is adapted to be placed between the stiles or uprights of a window, to act as a renewable window screen. This unit comprises a substantially rectangular frame 39 which is made extensible in length so that it may be fitted to various sizes of windows. The frame 39 comprises a pair of ends or uprights 40 and 41 to which are secured respectively pairs of side members 42 and 43 extending toward and in alignment with each other. A pair of sleeves 44 is provided, each sleeve partially encompassing and maintaining in alignment a separate set of side members 42, 43.

The end members 40, 41 and the side members 42, 43 of the frame may be made of any suitable material such as wood, for instance.

Referring to Fig. 7, the sleeves 44, which may be of sheet metal, are formed to fully engage three surfaces of the side members 42, 43, and to partially engage the fourth or inner surfaces of the members so that the latter are telescopically received by the sleeves and securely held in alignment thereby, while yet being slidable therein so that the frame may be made smaller or larger.

According to this invention a pair of rollers 45 and 46 is mounted respectively adjacent and parallel to the end members 40 and 41 of the frame, the rollers extending substantially the entire distance between the pairs of side members 42, 43. The rollers 45 and 46 are rigidly secured to spindles 47 and 48 respectively which extend through the side members 42 and 43, the upper ends of the spindles preferably being provided with screw driver slots so that the rollers may be rotated when desired.

Referring to Fig. 5 a filtering medium comprising a comparatively stiff flock-coated, sheet-like strip 49 is mounted to extend between the pairs of side members 42 and 43, the ends of the strip 49 being secured to the rollers 45 and 46 respectively, and a reserve or supply portion of the strip being carried by the storage roller 45. The strip 49 is supported by a plurality of guide rollers 50 which extend between the pairs of side members 42 and 43 and are mounted in staggered relation with each other, so that the filtering strip 49 may be passed in-and-out between the guide rollers to follow a tortuous zigzag path. By this arrangement a maximum amount of surface of the filtering strip 49 is exposed for use between the pairs of side members 42 and 43, and by the provision of the manually rotatable rollers 45 and 46 carrying a supply of the strip 49, the frame 39, may be made smaller or larger and the rollers adjusted to maintain the filtering strip taut.

Since the filter strip 49 is comparatively stiff and self-supporting, the top and bottom edges thereof will abut and closely fit to the inner surfaces of the side members 42 and 43, thereby preventing escape of unfiltered air at these points from one side of the screen to the other. To hold the side members 42 and 43 in intimate contact with the upper and lower edges of the filtering strip 49 along the central portions of the frame 39, a pair of tie-rods 51 is provided, Figs. 4, 5, and 7, which extend through the side members and maintain the proper spacing of same.

The guide rollers 50 may be provided with retractable spindle pins at their ends as illustrated in Fig. 3, to facilitate assembly of the filtering unit and also replacement of the filtering strip 49 when this latter is necessary.

To prevent the escape of unfiltered air past the rollers 45 and 46, a pair of sheet metal housings 52 is provided, the housings being secured to the end members 40 and 41 respectively and partially encompassing the rollers as shown in Fig. 5. The housings 52 have curled vertical edges which are located to continuously engage one side of the filtering strip 49 adjacent the associating roller at all times regardless of the amount of strip the roller is carrying. Preferably pins 53 are passed through the curled edges of the housings and anchored in the side members 42 and 43 to maintain the proper positioning of the strip-engaging edges. The upper and lower ends of the housings 52 may be shaped to form closure means at the ends of the rollers, and may be secured to the frame by drive nails 54 as indicated.

The present invention provides by the above construction an effective air-filtering screen unit for use with windows of different sizes, whereby a large surface of filtering medium is exposed for use and wherein the filtering medium may be quickly and conveniently renewed when clogged with dirt or rendered ineffective for other reasons.

While the foregoing has been described as applied to a window, it is to be understood that the device may be used with all air openings and particularly those of air-conditioning systems.

Variations and modifications may be made within the scope of this invention and portions of the improvements may be used without others.

I claim:

1. An air-filtering unit comprising a pair of spaced substantially parallel plates having correspondingly located circular edges; a pair of spaced substantially parallel rollers each extending from one plate to the other at points adjacent said edges; a filter medium comprising a sheet-like screen, a portion of which is supported for filtering use between the plates adjacent said circular edges, the remaining portions of the screen being rolled around the rollers whereby turning of the latter will bring succeeding portions of the screen into use; a plurality of guide rollers extending between the plates, mounted in staggered relation with each other along the said circular edges, the screen extending in-and-out between the guide rollers to follow substantially a zigzag generally-circular path; an imperforate housing mounted between the plates, having opposite edges engaging the screen adjacent each of the rollers, said housing extending from one roller to the other so that the screen and housing thereby enclose a space between the plates; an aperture in one of said plates, providing an air passage from the said enclosed space; and a second sheet-like filter screen connected at opposite edges with the housing adjacent the rollers, said second screen being extended between the plates closely adjacent the said circular edges, and enclosing the said zigzag portions of the first-mentioned screen whereby air being sucked out of the enclosed space between the plates through the said aperture is first doubly filtered in passing into the space through the said screens.

2. The invention as defined in claim 1 in which the plates are substantially rigid, and are immovably secured together, and in which the screen comprises a comparatively stiff self-supporting flock-coated wire mesh the edges of which abut the plates, the stiffness of the mesh and the rigidity of the plates preventing the escape of air in any substantial quantity past the said edges.

3. An air-filtering unit comprising a frame having an air intake opening and an air outlet opening; a pair of rollers mounted in the frame; a filter medium comprising a stiff, self-supporting sheet-like screen extending across the frame between the intake opening and outlet opening, said screen being rolled around the rollers whereby succeeding portions of the screen may be extended between the openings by turning the rollers, to thereby renew the filter medium; a pair of imperforate housings mounted in the frame, each partially encompassing a separate one of the rollers, and having an edge adapted and located to continuously engage the intake side of the screen adjacent the roller, said housing preventing escape of air around the roller from said intake side; and a second screen extending across the frame and enclosing the intake side of the filter medium, opposite edges of the second screen being respectively connected to the imperforate housings so that a totally enclosed space exists between the filter medium and second screen.

4. An air-filtering unit comprising a pair of spaced plates; a pair of spaced substantially parallel rollers extending from one plate to the other; and a filter medium comprising a comparatively stiff self-supporting sheet-like screen, a portion of which is exposed for filtering use between corresponding parts of the plates with the opposite edges of the portion engaging the two inner surfaces of the plates, the remaining portions of the screen being rolled around the rollers whereby turning of the latter will bring succeeding portions of the screen into use, one of said plates having an air outlet aperture located wholly on one side of the line of engagement of the screen with said plate, and a housing connected to the plates and engaging the screen adjacent each of the rollers, said housing and screen enclosing a space between the plates having communication with the said outlet aperture.

LOUIS SPRARAGEN.

REFERENCES CITED

The following references are of record in the file of this patent:

UNITED STATES PATENTS

| Number | Name | Date |
| --- | --- | --- |
| 741,210 | Young | Oct. 13, 1903 |
| 1,212,450 | Bunnell | Jan. 16, 1917 |
| 1,387,731 | McVickar | Aug. 16, 1921 |
| 1,814,855 | Robbins et al. | July 14, 1931 |
| 1,822,471 | Borden | Sept. 8, 1931 |
| 1,982,639 | Christofferson | Dec. 4, 1934 |
| 2,016,991 | Dollinger | Oct. 8, 1935 |